US011926119B2

(12) United States Patent
Wetsch et al.

(10) Patent No.: US 11,926,119 B2
(45) **Date of Patent: *Mar. 12, 2024**

(54) DUNNAGE APPARATUS CARTON FILLER

(71) Applicant: Pregis Innovative Packaging LLC, Deerfield, IL (US)

(72) Inventors: Thomas D. Wetsch, Naples, FL (US); Eric C. Wright, Bollingbrook, IL (US)

(73) Assignee: Pregis Innovative Packaging LLC, Chicago, IL (US)

( * ) Notice: Subject to any disclaimer, the term of this patent is extended or adjusted under 35 U.S.C. 154(b) by 70 days.

This patent is subject to a terminal disclaimer.

(21) Appl. No.: 17/347,044

(22) Filed: Jun. 14, 2021

(65) Prior Publication Data

US 2021/0299990 A1 Sep. 30, 2021

Related U.S. Application Data

(63) Continuation of application No. 15/592,753, filed on May 11, 2017, now Pat. No. 11,034,121.

(51) Int. Cl.
*B31D 5/00* (2017.01)

(52) U.S. Cl.
CPC ......... *B31D 5/0052* (2013.01); *B31D 5/0043* (2013.01); *B31D 2205/0058* (2013.01); *B31D 2205/007* (2013.01)

(58) Field of Classification Search
CPC ........... B31D 5/0039–0069; B31D 2205/0058; B31D 2205/007; B65H 2801/63
See application file for complete search history.

(56) References Cited

U.S. PATENT DOCUMENTS

| | | | |
|---|---|---|---|
| 435,968 | A | 9/1890 | Hart |
| 1,031,829 | A | 7/1912 | Adams |
| 1,448,646 | A | 3/1923 | Ward |
| 2,539,976 | A | 1/1951 | Samson |
| 2,599,618 | A | 6/1952 | Dempster |
| 2,786,399 | A | 3/1957 | Mason |
| 3,001,735 | A | 9/1961 | Francik |
| 3,052,146 | A | 9/1962 | Glendening |
| 3,080,033 | A | 3/1963 | Scott |
| 3,375,851 | A | 4/1968 | Henry |
| 3,466,716 | A | 9/1969 | Hancock et al. |
| 3,509,797 | A | 5/1970 | Johnson |
| 3,509,798 | A | 5/1970 | Johnson |

(Continued)

FOREIGN PATENT DOCUMENTS

| | | | |
|---|---|---|---|
| DE | 19520907 A1 | 1/1996 | |
| EP | 0903219 A2 * | 10/1999 | .......... B31D 5/0047 |

(Continued)

*Primary Examiner* — Joshua G Kotis
(74) *Attorney, Agent, or Firm* — Fox Rothschild LLP

(57) ABSTRACT

Disclosed is a dunnage apparatus, including a converting station and a deflector. The converting station converts a line of high-density supply material into low-density dunnage and ejects the dunnage at an exit in an exit trajectory along a path. The deflector is repositionable with respect to the exit between a first position, in which the deflector is interposed in the path to deflect the path of the dunnage from the exit trajectory to a first deflected trajectory, and a second position. The deflector is retained in each position during the ejection of the dunnage.

10 Claims, 12 Drawing Sheets

(56) References Cited

U.S. PATENT DOCUMENTS

| | | | |
|---|---|---|---|
| 3,542,268 A | 11/1970 | Schramm | |
| 3,650,877 A | 3/1972 | Johnson | |
| 3,741,403 A | 6/1973 | Fleischer, Jr. et al. | |
| 3,847,159 A | 11/1974 | Hofer | |
| 4,054,235 A | 10/1977 | Witcher | |
| 4,450,996 A | 5/1984 | Kamp | |
| 4,598,531 A | 7/1986 | Ruff et al. | |
| 4,699,609 A | 10/1987 | Komaransky et al. | |
| 4,844,316 A | 7/1989 | Keeny | |
| 5,078,311 A | 1/1992 | Taguchi et al. | |
| 5,088,972 A | 2/1992 | Parker | |
| 5,131,903 A | 7/1992 | Levine et al. | |
| 5,188,581 A | 2/1993 | Baldacci | |
| 5,211,620 A | 5/1993 | Ratzel et al. | |
| 5,219,126 A | 6/1993 | Schutz | |
| 5,232,430 A | 8/1993 | Nitsch | |
| 5,309,603 A | 5/1994 | Oexler et al. | |
| 5,322,477 A | 6/1994 | Armington et al. | |
| 5,377,570 A | 1/1995 | Giljam | |
| 5,387,173 A | 2/1995 | Simmons, Jr. | |
| 5,439,730 A | 8/1995 | Kelly et al. | |
| 5,474,250 A | 12/1995 | Birkmann et al. | |
| 5,487,717 A | 1/1996 | Tekavec et al. | |
| 5,637,071 A | 6/1997 | Simmons et al. | |
| 5,829,231 A | 11/1998 | Harding et al. | |
| 5,864,484 A | 1/1999 | Harding | |
| 5,902,223 A | 5/1999 | Simmons | |
| 5,910,079 A | 6/1999 | Watanabe | |
| 5,989,176 A | 11/1999 | Ratzel et al. | |
| 6,019,715 A * | 2/2000 | Ratzel | B31D 5/0047 493/464 |
| 6,026,632 A | 2/2000 | Simmons | |
| 6,076,764 A | 6/2000 | Robinson | |
| 6,095,454 A | 8/2000 | Simmons, Jr. et al. | |
| 6,179,765 B1 | 1/2001 | Toth | |
| 6,217,501 B1 * | 4/2001 | Simmons, Jr. | B31D 5/0047 493/464 |
| 6,237,449 B1 | 5/2001 | Orlosky | |
| 6,378,800 B1 | 4/2002 | Apichom | |
| 6,416,451 B1 * | 7/2002 | Ratzel | B31D 5/0047 493/464 |
| 6,524,230 B1 | 2/2003 | Harding et al. | |
| 6,632,165 B1 | 10/2003 | Letourneau et al. | |
| 6,632,311 B1 | 10/2003 | Glenna et al. | |
| 6,673,001 B2 | 1/2004 | Toth | |
| 6,675,442 B2 | 1/2004 | Reinehr et al. | |
| 6,695,247 B2 | 2/2004 | Widlund | |
| 6,702,212 B2 | 3/2004 | Abba et al. | |
| 6,756,096 B2 | 6/2004 | Harding | |
| 6,790,302 B2 | 9/2004 | Beck et al. | |
| 6,802,467 B2 | 10/2004 | Abba et al. | |
| 6,887,329 B2 | 5/2005 | Harding | |
| 6,981,352 B2 | 1/2006 | Chow et al. | |
| 7,066,422 B1 | 6/2006 | Slocum | |
| 7,083,560 B2 | 8/2006 | Kobben et al. | |
| 7,186,208 B2 | 3/2007 | Demers et al. | |
| 7,347,809 B2 | 3/2008 | Toth | |
| 7,407,471 B2 | 8/2008 | Demers et al. | |
| 7,479,100 B2 | 1/2009 | Toth | |
| 7,481,163 B2 | 1/2009 | Theilacker | |
| 7,484,341 B2 | 2/2009 | Konno | |
| 7,585,268 B2 | 9/2009 | Cheich et al. | |
| 7,651,455 B2 | 1/2010 | Yampolsky et al. | |
| 7,743,927 B2 | 6/2010 | Svatek et al. | |
| 7,744,519 B2 | 6/2010 | Wetsch et al. | |
| 7,771,338 B2 | 8/2010 | Wetsch et al. | |
| 7,788,884 B2 * | 9/2010 | Cheich | B31D 5/0047 53/238 |
| 8,016,735 B2 | 9/2011 | Wetsch et al. | |
| 8,554,363 B2 | 10/2013 | Sperry et al. | |
| 8,555,761 B2 | 10/2013 | Keily et al. | |
| 8,641,591 B2 | 2/2014 | Wetsch et al. | |
| 8,820,238 B2 | 9/2014 | Brandenburg et al. | |
| 8,900,111 B2 | 12/2014 | Wetsch et al. | |
| 8,938,858 B2 | 1/2015 | Bailey | |
| 9,254,578 B2 | 2/2016 | Wetsch et al. | |
| 9,321,235 B2 | 4/2016 | Cheich et al. | |
| 10,093,070 B2 | 10/2018 | Lintala et al. | |
| 11,034,121 B2 * | 6/2021 | Wetsch | B31D 5/0043 |
| 2002/0107129 A1 | 8/2002 | Manley | |
| 2002/0119876 A1 | 8/2002 | Lu et al. | |
| 2002/0193224 A1 | 12/2002 | Toth | |
| 2003/0073558 A1 | 4/2003 | Chesterson et al. | |
| 2003/0092552 A1 | 5/2003 | Armington et al. | |
| 2004/0142806 A1 | 7/2004 | Coppus et al. | |
| 2004/0207150 A1 | 10/2004 | Hendzel | |
| 2004/0266598 A1 | 12/2004 | Toth | |
| 2005/0055987 A1 | 3/2005 | White et al. | |
| 2005/0181924 A1 | 8/2005 | Demers et al. | |
| 2005/0247220 A1 | 11/2005 | Brandenburg et al. | |
| 2007/0117703 A1 | 5/2007 | Cavaliere et al. | |
| 2007/0117704 A1 | 5/2007 | Toth | |
| 2008/0070773 A1 | 3/2008 | Wetsch et al. | |
| 2008/0076653 A1 | 3/2008 | Shaw et al. | |
| 2008/0098699 A1 | 5/2008 | Cheich et al. | |
| 2008/0207421 A1 | 8/2008 | Wetsch et al. | |
| 2008/0261794 A1 | 10/2008 | Slovencik | |
| 2009/0023570 A1 | 1/2009 | Kung et al. | |
| 2009/0026306 A1 | 1/2009 | Kempster et al. | |
| 2009/0082187 A1 | 3/2009 | Cheich et al. | |
| 2009/0231123 A1 | 9/2009 | Rowell et al. | |
| 2010/0029456 A1 | 2/2010 | Cheich | |
| 2010/0127112 A1 | 5/2010 | Aquarius | |
| 2010/0132529 A1 | 6/2010 | Miyazaki | |
| 2011/0052875 A1 | 3/2011 | Wetsch et al. | |
| 2011/0053749 A1 * | 3/2011 | Wetsch | B65H 1/10 493/464 |
| 2011/0053750 A1 | 3/2011 | Wetsch et al. | |
| 2012/0035038 A1 | 2/2012 | Lembach et al. | |
| 2012/0107129 A1 | 5/2012 | Kulenkampff et al. | |
| 2012/0165172 A1 | 6/2012 | Wetsch et al. | |
| 2012/0329629 A1 | 12/2012 | Wetsch et al. | |
| 2013/0092716 A1 | 4/2013 | Wetsch et al. | |
| 2013/0105613 A1 | 5/2013 | Persson | |
| 2013/0237398 A1 | 9/2013 | Lintala et al. | |
| 2014/0106954 A1 | 4/2014 | Deis et al. | |
| 2015/0014205 A1 | 1/2015 | Yap et al. | |
| 2015/0119224 A1 | 4/2015 | Orsini et al. | |
| 2015/0126351 A2 | 5/2015 | Wetsch et al. | |
| 2017/0021585 A1 | 1/2017 | Wetsch et al. | |
| 2017/0087791 A1 | 3/2017 | Lintala et al. | |
| 2018/0326688 A1 | 11/2018 | Wetsch et al. | |

FOREIGN PATENT DOCUMENTS

| | | | |
|---|---|---|---|
| EP | 1026113 | A2 | 8/2000 |
| FR | 2667854 | A1 | 4/1992 |
| FR | 2798920 | A1 | 3/2001 |
| FR | 2798981 | A1 | 3/2001 |
| FR | 2808726 | A1 | 11/2001 |
| GB | 2173141 | A | 10/1986 |
| JP | 2005506216 | A | 3/2005 |
| JP | 2013067428 | A | 4/2013 |
| WO | 2009126838 | A2 | 10/2009 |
| WO | 2015061635 | A1 | 4/2015 |
| WO | 2017059348 | A1 | 4/2017 |

* cited by examiner

DUNNAGE APPARATUS CARTON FILLER

CROSS-REFERENCE TO RELATED APPLICATIONS

The present application is a continuation of U.S. patent application Ser. No. 15/592,753, filed May 11, 2017, entitled DUNNAGE APPARATUS CARTON FILLER, which is incorporated herein by reference in its entirety.

TECHNICAL FIELD

This invention is in the field of protective packaging systems.

BACKGROUND

In the context of paper-based protective packaging, paper sheet is crumpled to produce the dunnage. Most commonly, this type of dunnage is created by running a generally continuous strip of paper into a dunnage converting station that converts a compact supply of stock material, such as a roll of paper or a fanfold stack of paper, into a lower density dunnage material. The supply of stock material, such as in the case of fanfold paper, is pulled into the converting station from a stack that is either continuously formed or formed with discrete section connected together. The continuous strip of crumpled sheet material may be cut into desired lengths to effectively fill void space within a container holding a product. The dunnage material may be produced on an as-needed basis for a packer. The dunnage is used to fill a container for packaging. Needed is a way to facilitate packaging by changing the direction of the dunnage that is ejected from a converting station.

SUMMARY

Disclosed is a dunnage apparatus, including a converting station and a deflector. The converting station converts a line of high-density supply material into low-density dunnage and ejects the dunnage at an exit in an exit trajectory along a path. The deflector is repositionable with respect to the exit between a first position, in which the deflector is interposed in the path to deflect the path of the dunnage from the exit trajectory to a first deflected trajectory, and a second position. The deflector is retained in each position during the ejection of the dunnage.

The deflector in the second position can be disposed out of the path to avoid deflecting the dunnage. The converting station can include a housing, and the deflector in the second position can be retracted into the converting station housing. The deflector in the second position can be interposed in the path to deflect the path of the dunnage from the exit trajectory to a second deflected trajectory. The deflector can be repositionable between the first position and the second position by changing the angle of the deflector relative to the path. The deflector can be pivotable between the first and second positions to vary the angle. The deflector can be pivotable about a high-friction hinge. The deflector in the first position can be closer to the exit than in the second position so that the first deflected trajectory begins at a different location than the second deflected trajectory. The deflector can be slidable between the first and second positions. The deflector can be repositionable by sliding the deflection surface towards and away from the exit. The second position can comprise a range of second positions within a zone that extends along the exit trajectory; and the deflector can be slidable to the second position at any location within the zone; and the deflector can be configured to remain in place at the second position, withstanding impact by the ejected dunnage. The converting station can comprise opposed crumpling members that crumple the supply material to convert it into the dunnage and that eject the dunnage from the exit, such that the exit is located at said crumpling members. The dunnage apparatus can be free from components downstream of the deflector, so that the ejected dunnage, after hitting the deflector, falls into a container that is placed within the first deflected trajectory. The dunnage apparatus can include a cutting member disposed downstream of the exit that severs a downstream portion of the ejected dunnage from a portion of the dunnage still held by the converting station. The cutting member can be disposed upstream of the deflector with respect to the exit trajectory. The cutting member can be disposed further from the exit than the deflector in at least one of the first or second positions.

Disclosed is a method, comprising converting a line of high-density material into low-density dunnage at a converting station; ejecting the dunnage from an exit of the converting station in an exit trajectory along a path; positioning and retaining a deflector in a first position with respect to the exit, in which the deflector is interposed in the path to deflect the path of the dunnage from the exit trajectory to a first deflected trajectory; and repositioning and retaining the deflector in a second position with respect to the exit.

BRIEF DESCRIPTION OF THE DRAWINGS

The drawing figures depict one or more implementations in accordance with the present concepts, by way of example only, not by way of limitations. In the figures, like reference numerals refer to the same or similar elements.

DETAILED DESCRIPTION

Disclosed is a dunnage machine for converting a stock material into dunnage. More particularly, the dunnage machine includes a mechanism for deflecting the dunnage that is ejected from the apparatus, for example, to direct the dunnage into a packaging container. The present disclosure is generally applicable to systems and apparatus where supply material, such as a stock material, is processed.

Figure 1B:
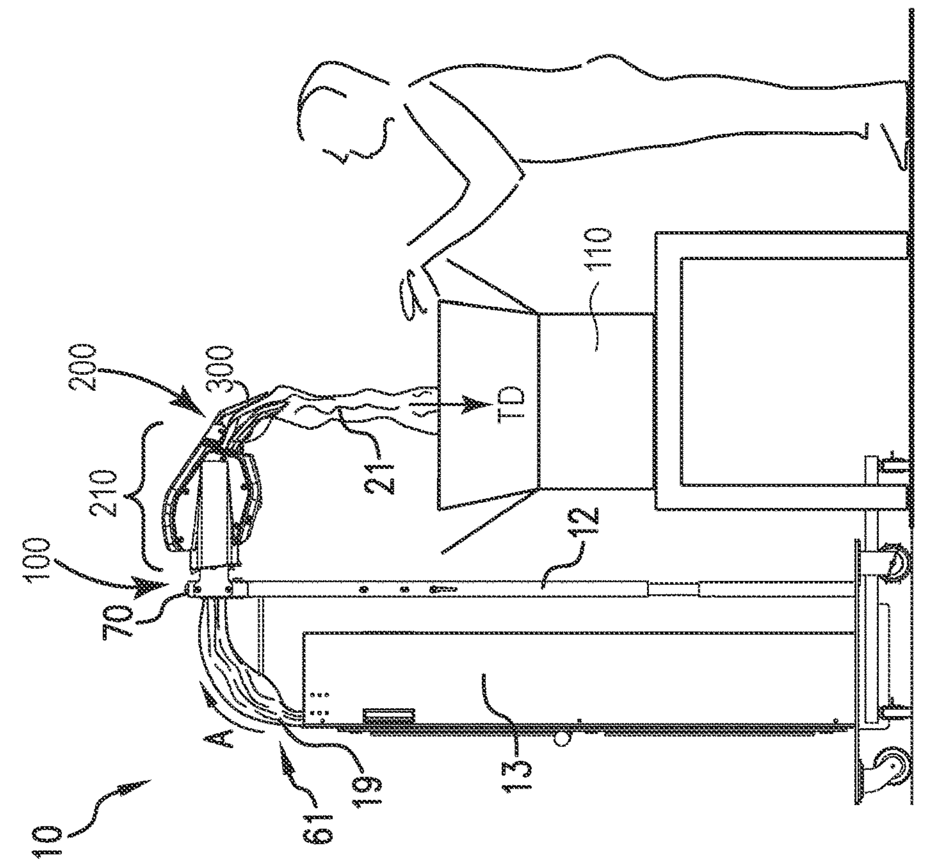
FIG. 1B is a side view thereof with the dunnage deflector positioned into the path to deflect the dunnage.
Figure 1A:
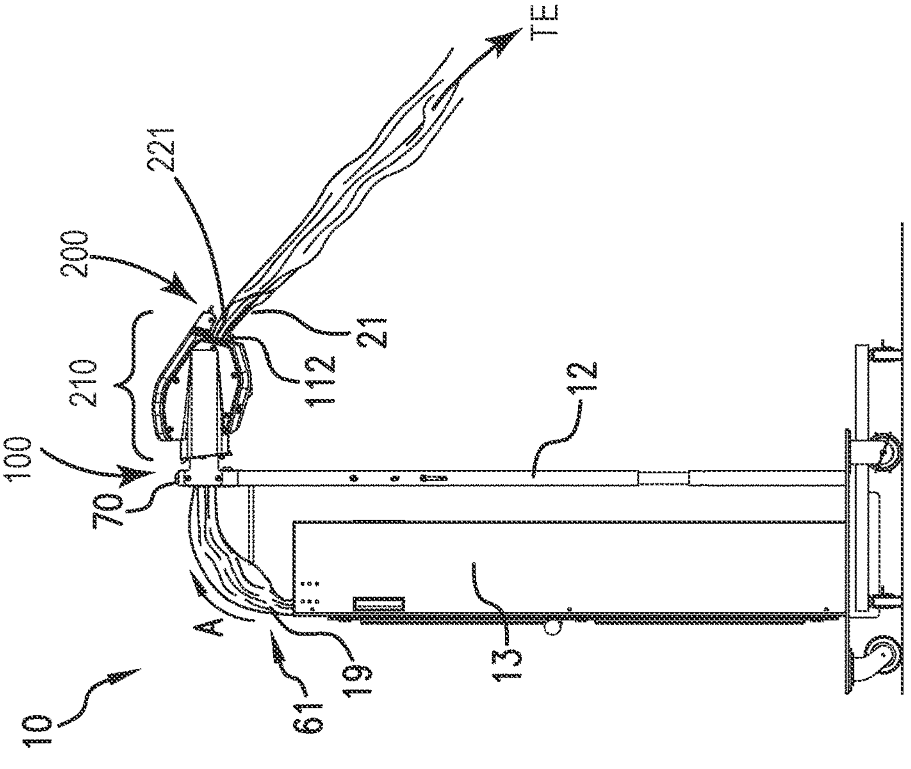
FIG. 1A is a side view of an embodiment of a dunnage conversion system, including a dunnage machine that ejects dunnage along a path. The dunnage machine includes a dunnage deflector positioned in a retracted position.
Figure 2:
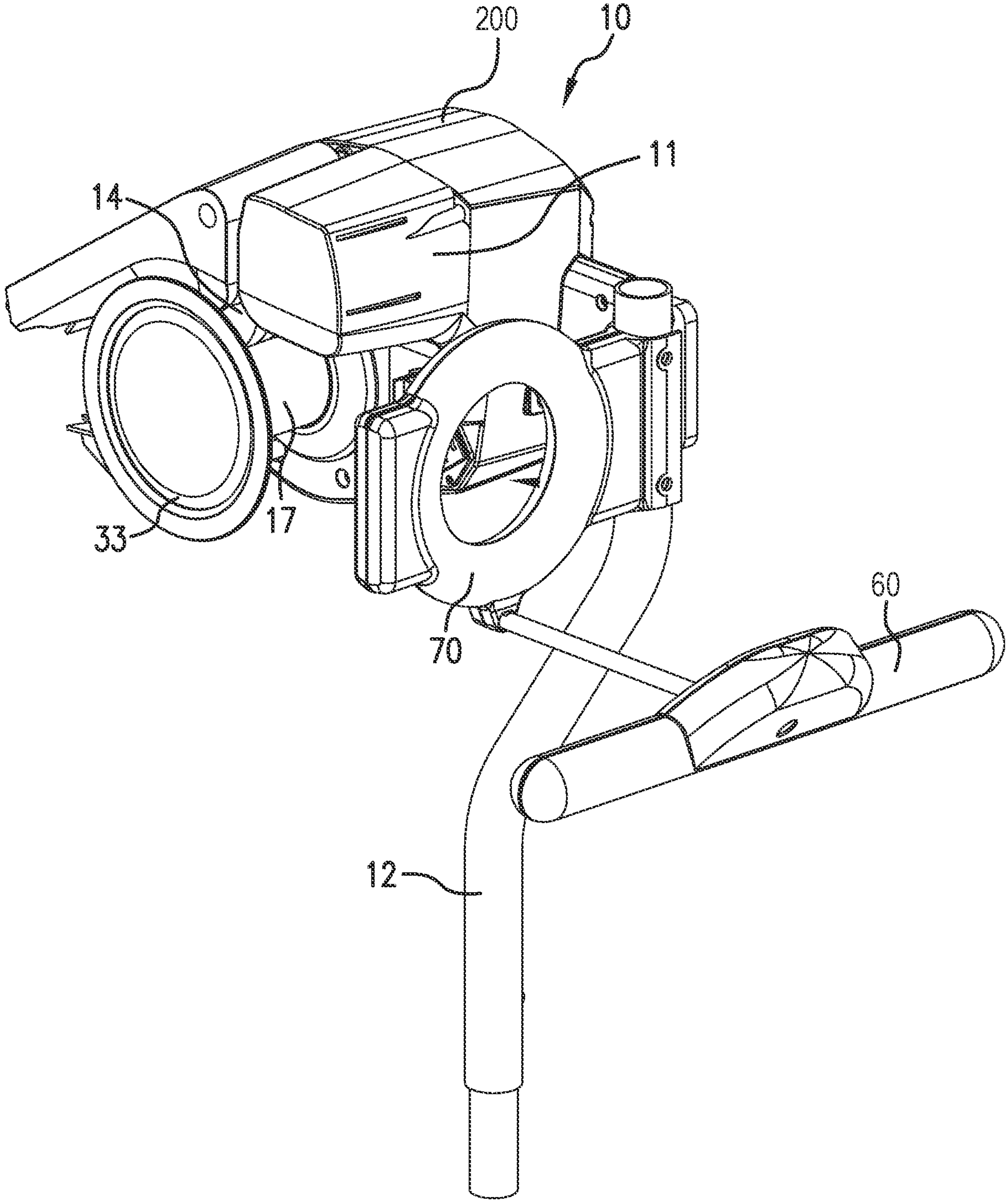
FIG. 2 is a perspective view of the dunnage machine shown in FIGS. 1A and 1B.

With reference to FIGS. 1A, 1B, and 2, a dunnage conversion system 10 is disclosed, including stock material 19 and a dunnage apparatus 200 for processing the stock material 19 to provide dunnage 21. In accordance with various embodiments, the dunnage apparatus 200 includes a supply station 13 for holding the supply material 19 and a dunnage machine 100. The dunnage machine 100 comprises a converting station 210 that converts the stock material 19 into dunnage 21 and ejects the dunnage 21 at an exit 221. A support 12 may be provided that supports the converting station 210 at a distance above the ground.

As shown in FIG. 1B, the dunnage machine includes a deflector 300 that is operable to change the trajectory of the dunnage 21 exiting the converting station 210. For example, the deflector 300 may be operable to aim the dunnage 21 into a carton 110, thus facilitating the packaging process. Embodiments of the deflector 300 are further discussed below.

The conversion apparatus is operable to convert stock material into dunnage and eject the dunnage in an exit trajectory along a path. The deflector is interposed within the path and is configured to deflect the dunnage from the exit trajectory to a deflected trajectory. The deflected trajectory can direct the dunnage towards the ground at a sharper angle than that of the exit trajectory. Thus, a user can position a container closer to the dunnage apparatus for collecting the dunnage, thereby conserving space in a packaging location.

The stock material may be stored in a roll (whether drawn from inside or outside the roll), a wind, a fan-folded source, or any other form. The stock material may be continuous or perforated. The conversion apparatus is operable to drive the stock material in a first direction, which can be a dispensing direction. The conversion apparatus is fed the stock material from the repository through a drum in a dispensing direction. The stock material can be any type of protective packaging material including other dunnage and void fill materials, inflatable packaging pillows, etc. Some embodiments use supplies of other paper or fiber-based materials in sheet form, and some embodiments use supplies of wound fiber material such as ropes or thread, and thermoplastic materials such as a web of plastic material usable to form pillow packaging material.

The converting station 210 operates to convert the stock material 19 into dunnage 21, according to various suitable methods. In accordance with various examples, as shown in FIGS. 1A and 1B, the stock material 19 is allocated from a bulk supply 61 and delivered to the converting station 210 for converting to dunnage material 21. The converting station 210 has an intake 70, through which it receives the stock material, for example, from the supply station 13. The converting station 210 incudes a drive mechanism 100 that is operable to pull or assist in pulling the stock material 19 into the intake 70. In some embodiments, the stock material 19 engages an shaping member 60 prior to the intake 70.

The drive mechanism 100 is able to pull or assist in pulling the stock material 19 into the intake 70. The stock material 19 begins being converted from dense stock material 19 to less dense dunnage material 21 by the intake 70 and then pulled through the drive mechanism 100 and dispensed in a dispensing direction A on the out-feed side 62 of the intake 70. The material can be further converted by crumpling, folding, flattening, or other similar methods that further create the low-density configuration.

The stock material 19 can be stored as stacked bales of fan-fold material. However, as indicated above, any other type of supply or stock material may be used. The stock material 19 can be contained in the supply station 13. In one example, the supply station 13 is a cart movable relative to the dunnage conversion system 10. The cart supports a magazine 130 suitable to contain the stock material 19. In other examples, the supply station 13 is not moveable relative to the dunnage conversion system 10. For example, the supply station 13 may be a single magazine, basket, or other container mounted to or near the dunnage conversion system 10.

The stock material 19 is fed from the supply side 61 through the intake on 70. The stock material 19 may be fanfolded, delivered in sheets, provided as a roll of material or similar supply techniques. In some embodiments, the stock material 19 comprises continuous or semi-continuous lengths of sheet material allowing for continuous or semi-continuous feeds into the dunnage conversion system 10. Multiple lengths can be daisy-chained together. Further, it is appreciated that various structures of the intake 70 can be used, such as those intakes forming a part of the converting stations disclosed in U.S. Pat. Pub. No. 2013/0092716, U.S. Publication 2012/0165172, U.S. Publication No 2011/0052875, and U.S. Pat. No. 8,016,735.

In one configuration, the dunnage conversion system 10 can include a support 12 for supporting the station. In one example, the support portion 12 includes an inlet guide 70 for guiding the sheet material into the dunnage conversion system 10. The support portion 12 and the inlet guide 70 are shown with the inlet guide 70 extending from the post. In other embodiments, the inlet guide may be combined into a single rolled or bent elongated element forming a part of the support pole or post. The elongated element extends from a floor base configured to provide lateral stability to the converting station. In one configuration, the inlet guide 70 is a tubular member that also functions as a support member for supporting, crumpling and guiding the stock material 19 toward the drive mechanism 100. Other inlet guide designs such as spindles may be used as well.

In accordance with various embodiments, the advancement mechanism is an electromechanical drive such as an electric motor 11 or similar motive device. The motor 11 is connected to a power source, such as an outlet via a power cord, and is arranged and configured for driving the dunnage conversion system 10. The motor 11 is an electric motor in which the operation is controlled by a user of the system, for example, by a foot pedal, a switch, a button, or the like. In various embodiments, the motor 11 is part of a drive portion, and the drive portion includes a transmission for transferring power from the motor 11. Alternatively, a direct drive can be used. The motor 11 is arranged in a housing and is secured to a first side of the central housing, and a transmission is contained within the central housing and operably connected to a drive shaft of the motor 11 and a drive portion, thereby transferring motor 11 power. Other suitable powering arrangements can be used.

The motor 11 is mechanically connected either directly or via a transmission to a drum 17, shown in FIG. 2, which causes the drum 17 to rotate with the motor 11. During operation, the motor 11 drives the drum 17 in either a dispensing direction or a reverse direction (i.e., opposite of the dispensing direction), which causes drum 17 to dispense the dunnage material 21 by driving it in the dispensing direction, depicted as arrows “A” in FIGS. 1A and 1B, or withdraw the dunnage material 21 back into the conversion machine in the direction opposite of A. The stock material 19 is fed from the supply side 61 of the intake 70 and over the drum 17, forming the dunnage material 21 that is driven in the dispensing direction “A” when the motor 11 is in operation. While described herein as a drum, this element of the driving mechanism may also be wheels, conveyors, belts or any other device operable to advance stock material or dunnage material through the system.

In accordance with various embodiments, the dunnage conversion system 10 includes a pinch portion operable to press on the material as it passes through the drive mechanism 100. As an example, the pinch portion includes a pinch member such as a wheel, roller, sled, belt, multiple elements, or other similar member. In one example, the pinch portion includes a pinch wheel 14. The pinch wheel 14 is supported via a bearing or other low friction device positioned on an axis shaft arranged along the axis of the pinch wheel 14. In some embodiments, the pinch wheel can be powered and driven. The pinch wheel 14 is positioned adjacent to the drum such that the material passes between the pinch wheel 14 and the drum 17. In various examples, the pinch wheel 14 has a circumferential pressing surface arranged adjacent to or in tangential contact with the surface of the drum 17. The pinch wheel 14 may have any size, shape, or configuration. Examples of size, shape, and configuration of the pinch wheel may include those described in U.S. Pat. Pub. No. 2013/0092716 for the press wheels. In the examples shown, the pinch wheel 14 is engaged in a position biased against the drum 17 for engaging and crushing the stock material 19 passing between the pinch wheel 14 and the drum 17 to convert the stock material 19 into dunnage material 21. The drum 17 or the pinch wheel 14 is connected to the motor 11 via a transmission (e.g., a belt drive or the like). The motor 11 causes the drum or the pinch wheel to rotate.

In accordance with various embodiments, the drive mechanism 100 may include a guide operable to direct the material as it is passes through the pinch portion. In one example, the guide may be a flange 33 mounted to the drum 17. The flange 33 may have a diameter larger than the drum 17 such that the material is kept on the drum 17 as it passes through the pinch portion.

The drive mechanism 100 controls the incoming dunnage material 19 in any suitable manner to advance it from a conversion device to the cutting member. For example, the pinch wheel 14 is configured to control the incoming stock material. When the high-speed incoming stock material diverges from the longitudinal direction, portions of the stock material contacts an exposed surface of the pinch wheels, which pulls the diverging portion down onto the drum and help crush and crease the resulting bunching material. The dunnage may be formed in accordance with any techniques including ones referenced to herein or ones known such as those disclosed in U.S. Pat. Pub. No. 2013/0092716.

In accordance with various embodiments, the conversion apparatus 10 can be operable to change the direction of the stock material 19 as it moves within the conversion apparatus 10. For example, the stock material is moved by a combination of the motor 11 and drum 17 in a forward direction (i.e., from the inlet side to the dispensing side) or a reverse direction (i.e., from the dispensing side to the supply side 61 or direction opposite the dispensing direction). This ability to change direction allows the drive mechanism 100 to cut the dunnage material more easily by pulling the dunnage material 19 directly against an edge 112. As the stock material 19 is fed through the system and dunnage material 21 it passes over or near a cutting edge 112 without being cut.

Preferably, the cutting edge 112 is curved or directed downward so to guide the material in the out-feed segment of the path as it exits the system near the cutting edge 112 and potentially around the edge 112. The cutting member 112 can be curved at an angle similar to the curve of the drum 17, but other curvature angles could be used. It should be noted that the cutting member 110 is not limited to cutting the material using a sharp blade, but it can include a member that causes breaking, tearing, slicing, or other methods of severing the dunnage material 21. The cutting member 112 can also be configured to fully or partially sever the dunnage material 21.

In various embodiments, the transverse width of the cutting edge 112 is preferably about at most the width of the drum 17. In other embodiments, the cutting edge 112 can have a width that is less than the width of the drum 17 or greater than the width of the drum 17. In one embodiment, the cutting edge 112 is fixed; however, it is appreciated that in other embodiments, the cutting edge 112 could be moveable or pivotable. The edge 112 is oriented away from the driving portion. The edge 112 is preferably configured sufficient to engage the dunnage material 21 when the dunnage material 21 is drawn in reverse. The edge 112 can comprise a sharp or blunted edge having a toothed or smooth configuration, and in other embodiments, the edge 112 can have a serrated edge with many teeth, an edge with shallow teeth, or other useful configuration. A plurality of teeth is defined by having points separated by troughs positioned there between.

As discussed above, any stock material may be used. For example, the stock material may have a basis weight of about at least 20 lbs., to about at most 100 lbs. Examples of paper used include 30 pound kraft paper. The stock material 19 comprises paper stock stored in a high-density configuration having a first longitudinal end and a second longitudinal end that is later converted into a low-density configuration. The stock material 19 is a ribbon of sheet material that is stored in a fan-fold structure, as shown in FIG. 1A, or in coreless rolls. The stock material is formed or stored as single-ply or multiple plies of material. Where multi-ply material is used, a layer can include multiple plies. It is also appreciated that other types of material can be used, such as pulp-based virgin and recycled papers, newsprint, cellulose and starch compositions, and poly or synthetic material, of suitable thickness, weight, and dimensions.

In various embodiments, the stock material includes an attachment mechanism such as an adhesive portion that is operable as a connecting member between adjacent portions of stock material. Preferably, the adhesive portion facilitates daisy-chaining the rolls together to form a continuous stream of sheet material that can be fed into the converting station 70.

Generally, the dunnage material 21 moves through the system along a material path A. The material path A has various segments such as the feed segment from the supply side 61 and severable segment 24. The dunnage material 21 on the out-feed side 62 substantially follows the path A as it is ejected from the dunnage machine 10.

FIG. 1A shows a continuous, yet uncut, length of the dunnage 21 being ejected from the exit 221 at an exit trajectory TE along a path. FIG. 1B shows the dunnage machine including a deflector 300 that is interposed in the path to deflect the path of the continuous length of dunnage from the exit trajectory TE to a deflected trajectory TD. For example, the deflector 300 can bend the path of the dunnage from the exit trajectory TE to the deflected trajectory TD. In the embodiment shown in FIGS. 1A and 1B, the deflected trajectory TD is angled downward at a steeper angle than the exit trajectory TE, to direct the continuous length of dunnage 21 into container 110, so that simultaneously a portion of the continuous length of dunnage is being converted while another portion of the continuous length of dunnage is being deflected by the deflector. In the embodiment shown in FIGS. 1A and 1B, the deflected trajectory aims substantially directly downward, so that dunnage 21 is directed into container 110 at a location substantially beneath the exit 221. Thus, the deflector 300 is operable to aim the dunnage 21 into a carton 110, thus facilitating the packaging process. Also, in cases in which the dunnage machine includes a cutting member 112 disposed proximate the exit 221, the deflector 300 can direct the dunnage towards the cutting member 112, thus facilitating the user in separating the dunnage 21 with the cutting member 112.

FIGS. 3A-3D show side views of a dunnage machine, including a converting station that ejects dunnage at an exit 221 in an exit trajectory along a path, and a deflector 300 that is repositionable with respect to the exit 221. As shown in FIGS. 3A-3D and 4A-4B, in some embodiments, when the dunnage 21 is ejected from the exit 221, it travels along the exit trajectory TE in the E-direction, and the deflector 300 is repositionable between various positions by changing the angle of the deflector 300 relative to the E-direction.

In some embodiments, the E-direction is the direction that the dunnage is traveling at the last place of contact within the converting station. The E-direction is typically the direction of the tangent between the crumpling rollers, or the direction in which the dunnage leaves the elements of the converting station that convert the supply material into dunnage, or that move the dunnage out of the dunnage machine.

Figure 3A:
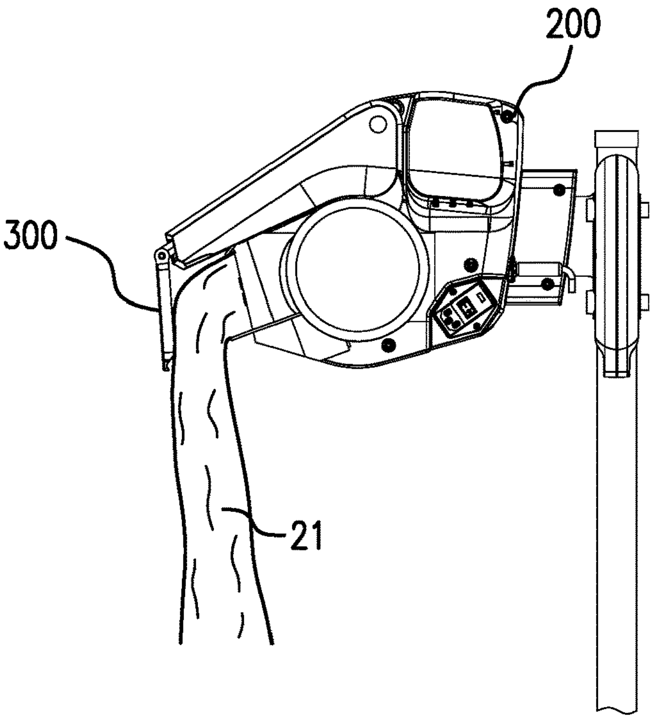
FIGS. 3A-3D are enlarged side views of the dunnage machine of FIGS. 1A and 1B, operating with the dunnage deflector in various positions.
Figure 3B:
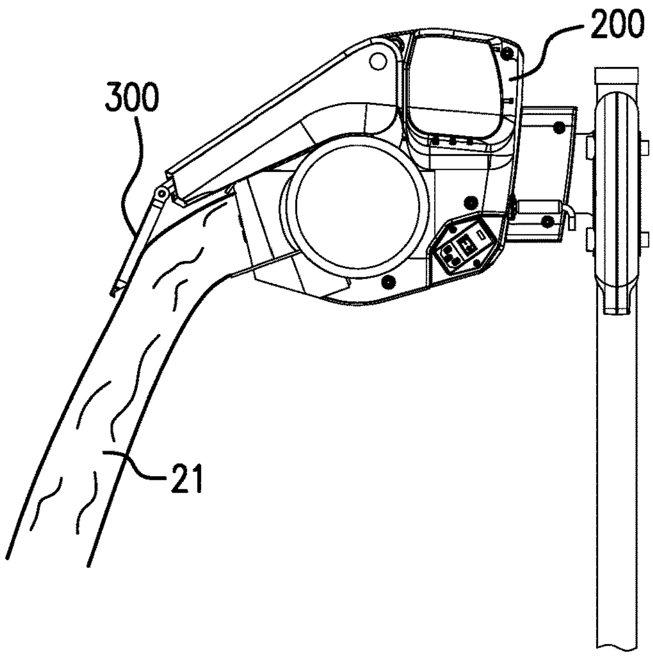
Figure 4A:
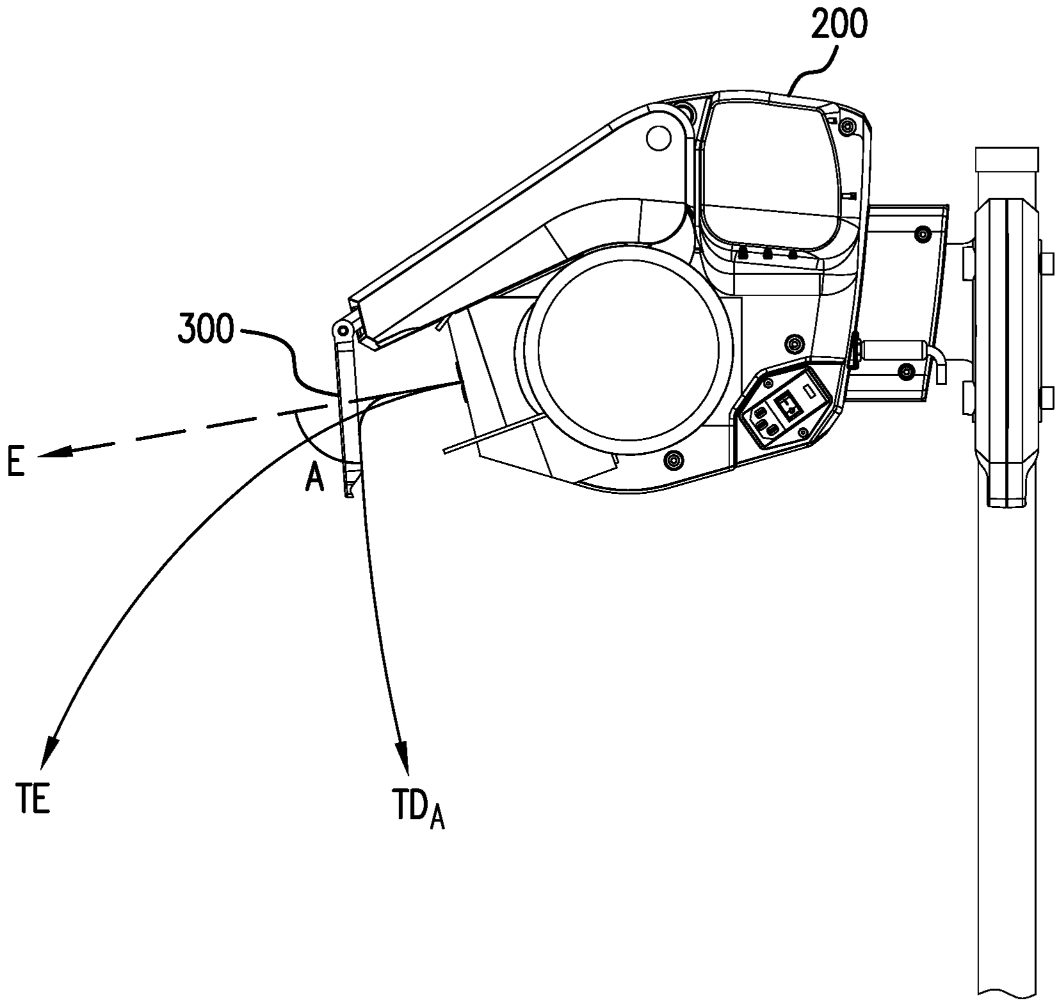
FIG. 4A is a side view of the dunnage machine of FIGS. 1A and 1B, with the deflector configured as shown in FIG. 3A.
Figure 4B:
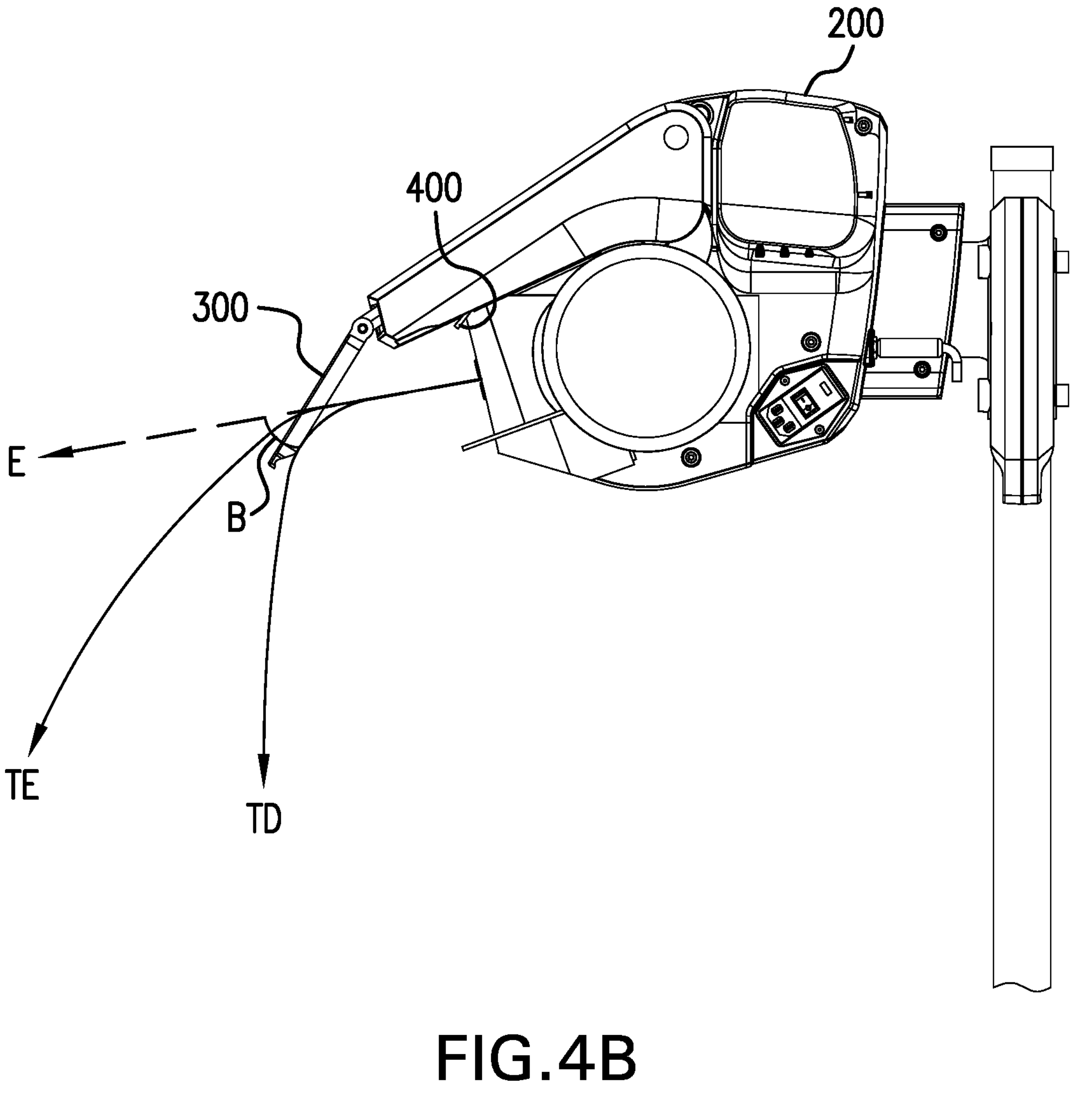
FIG. 4B is a side view of the dunnage machine of FIGS. 1A and 1B, with the deflector configured as shown in FIG. 4B.

FIGS. 3A and 3B show the deflector 300 in two positions that are both interposed in the path and positioned to deflect the dunnage 21 from the exit trajectory TE to a deflected trajectory. FIG. 4A is a side view of the dunnage machine, with a comparison of the exit trajectory TE and the deflected trajectory $TD_A$ that can result from the deflector 300 positioned as it is shown in FIG. 3A. FIG. 4B is a side view of the dunnage machine, with a comparison of the exit trajectory TE and the deflected trajectory $TD_A$ that can result from the deflector 300 positioned as it is shown in FIG. 3B.

In FIGS. 3A and 4A, the deflector 300 comprises a deflecting surface that extends at angle A relative to the E-direction, and deflects the dunnage at a deflected trajectory $TD_A$. In FIGS. 3B and 4B, the deflecting surface extends at angle B relative to the E-direction, and deflects the dunnage at another deflected trajectory $TD_B$. As shown, angle A is greater than angle B, causing the deflector 300 in FIGS. 3A and 4A to deflect the dunnage 21 more than in FIGS. 3B and 4B. For example, the deflector 300 positioned in FIG. 3A bends the path of the dunnage more than when it is positioned in FIG. 3B. For example, the deflector 300 positioned in FIG. 3A directs the dunnage 21 at a steeper angle downward than in FIG. 3B.

Figure 3C:
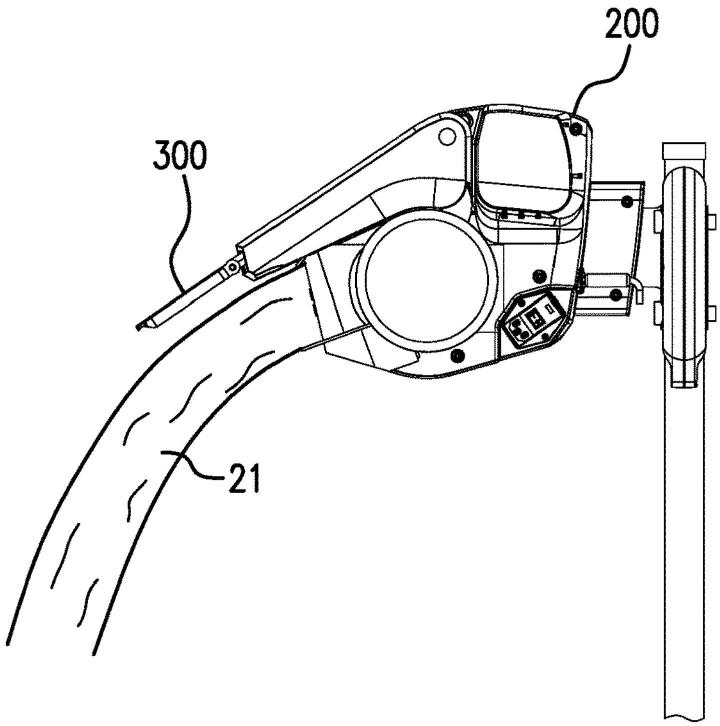

FIG. 3C shows the deflector 300 positioned so that it extends substantially parallel to the E-direction. Typically, in this position the deflector 300 is not interposed in the path of the dunnage 21 and does not deflect the path of the dunnage 21. In some cases, however, in this position the deflector 300 deflects the dunnage 21, but to a lesser degree than in FIGS. 3A and 3B.

FIGS. 1A and 4D show the deflector 300 in a retracted position so that it is disposed out of the path and does not deflect the dunnage 21. The converting station 210 can have a housing 222 that houses the drive mechanism, and the deflector 300 is retracted into the housing.

The deflector 300 can be repositionable by way of various suitable methods. In the embodiment shown in FIGS. 3A-3D, the deflector 300 is pivotable (e.g., about a hinge) between the various positions to change the angle of the deflector 300 relative to the exit, and thereby change the angle of the deflecting surface relative to the E-direction. In some embodiments, the deflector 300 is pivotable to any position within its pivotable range. In other embodiments, the deflector 300 is pivotable to a number of predetermined positions. The deflector can be retained in a position by way of various suitable methods, such as by friction, a ratchet, or a latch.

Figure 5A:
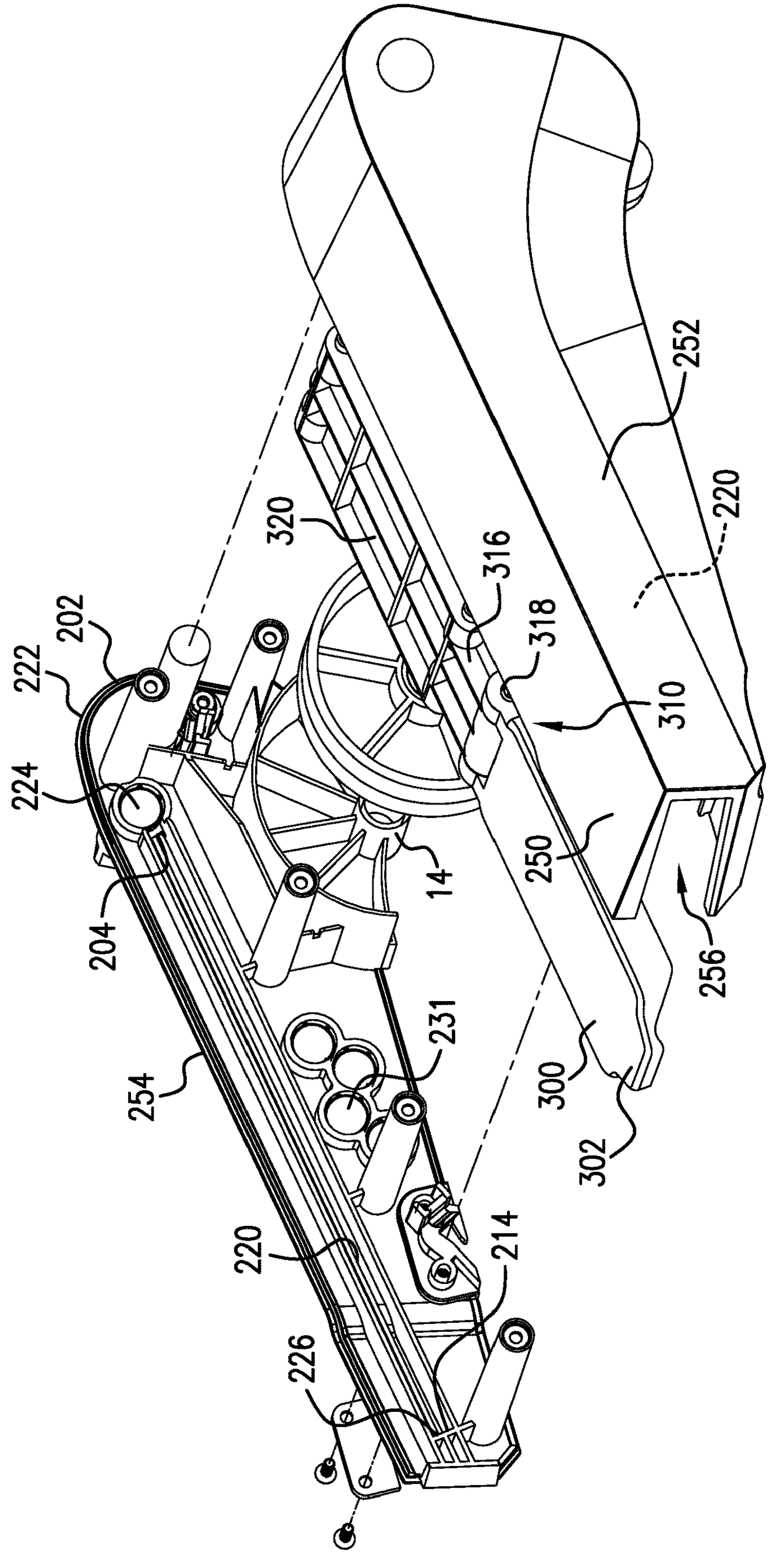
FIGS. 5A and 5B are exploded perspective views of the converting station and deflector of FIGS. 1A and 1B.
Figure 5B:
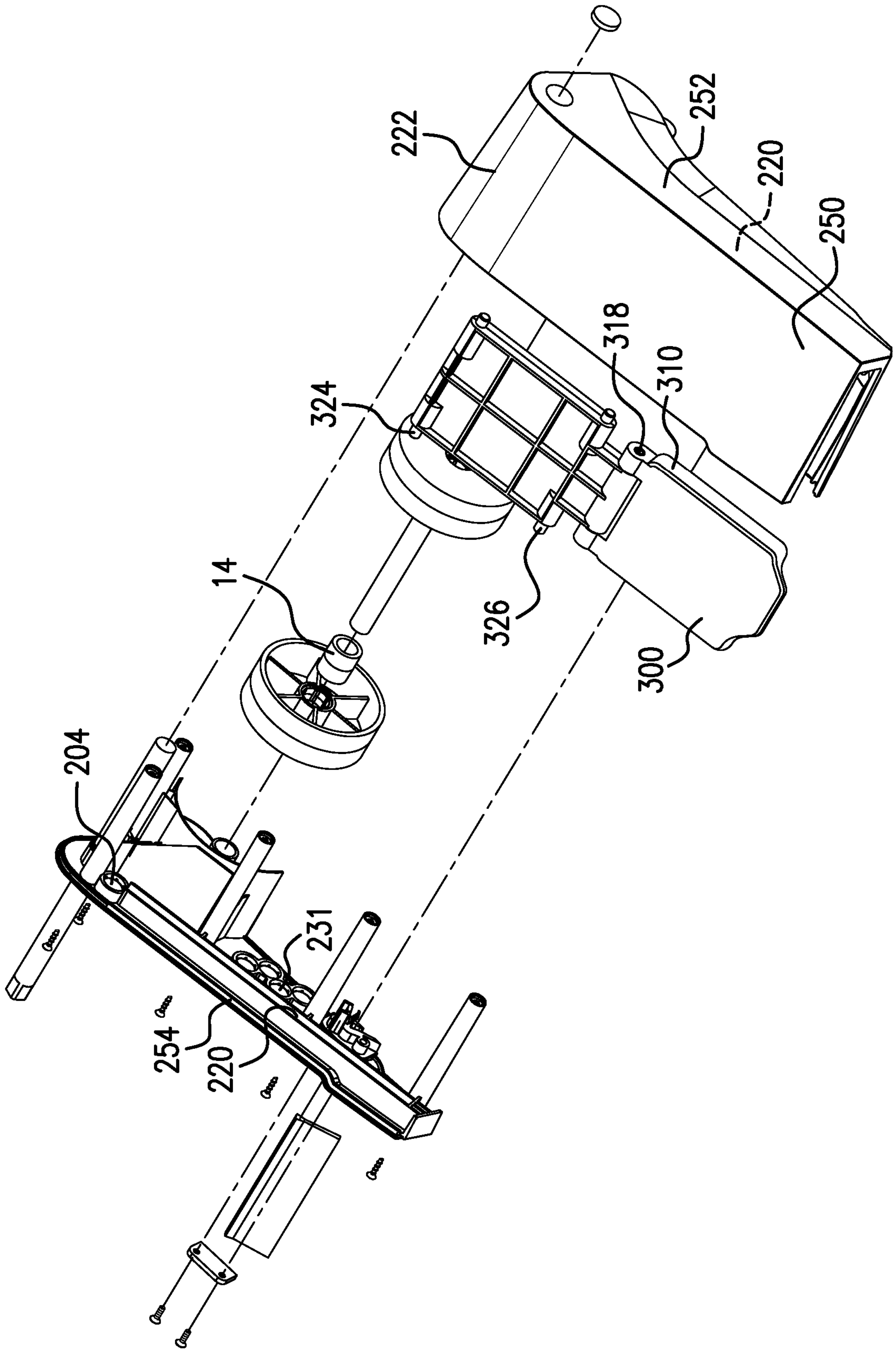

With reference to FIGS. 5A and 5B, in some embodiments, the deflector 300 is part of a deflection member 310 that also includes a base member 316 for supporting deflector 300. FIGS. 5A and 5B show deflector 300 pivotable relative to a base member 316 about hinge 318. The hinge can retain deflector 300 in a position with sufficient strength so that the deflector 300 maintains its position, withstanding the force of dunnage that is launched against it by the converting station. The hinge 318 may be a high-friction hinge. Additionally or alternatively, the hinge 318 may have a latch or other type of mechanical locking mechanism. In preferred embodiments, the deflector 300 is pivotable about the hinge 318 and remains in position, withstanding the force of the dunnage 21 that is deflected therefrom. In some embodiments, the dunnage machine 100 is configured so that a user can pivotally reposition the deflector 300 about the hinge 318 with his or her hand.

Figure 3D:
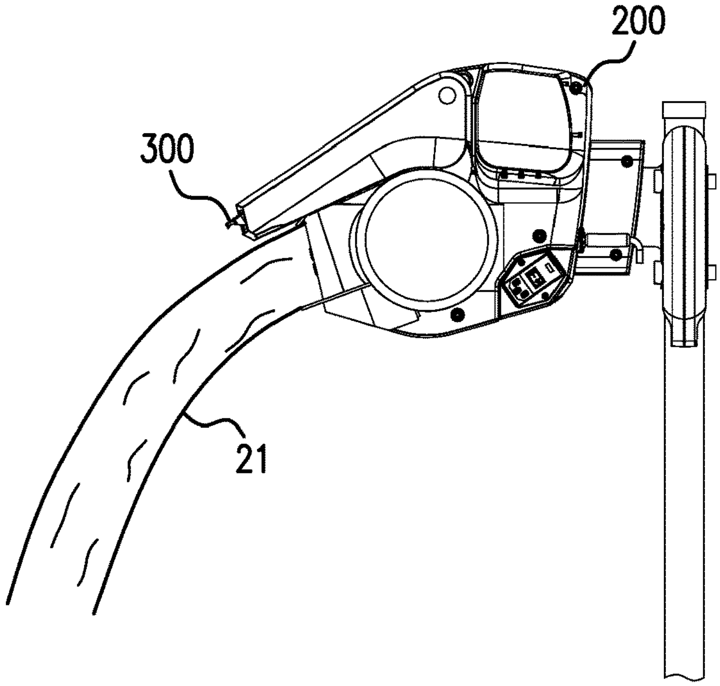

As shown in FIGS. 5A and 5B, in some embodiments, housing 222 includes a guide 220 and the deflection member 310 is moveable along the guide 220 to move the deflector 300 between an extended position (e.g., shown in FIGS. 3A-3C) to a retracted position (e.g., shown in FIG. 3D). The guide can extend along the interior of left and right sidewalls 254, 252 of housing 222. The guide 220 can comprise two left and right tracks extending between an outer end 226 and an inner end 224, and the deflection member 310 can be slidable along the tracks between an outer and inner ends 226, 224 to slide the deflector 300 relative to the exit 221. As shown in FIGS. 3C, 3D, 5A, and 5B, the deflector 300 can pivot be to a position so that top and bottom surfaces of the deflector 300 are aligned with top and bottom surfaces of base member 316. Thus, the deflection member 310 can slide along the guide 220 so that a substantial portion of the deflector 300 is contained within the housing 222. The housing 222 can have a cover 250 extending above the left and right sidewalls 254, 252, so that the deflection member 310 is substantially contained within housing 222 when in a retracted position. For example, in the retracted position, the deflection member 310 can be entirely contained within the housing 222 except for a handle portion 302 that is exposed out of deflector slot 256. Preferably, the housing 222 also covers the pinch wheel 14.

In embodiments, the deflection member 310 moves in other suitable ways besides sliding. For example, the interior of the housing side walls 254, 252 can have notches at various locations relative to the exit, and the deflector 300 can be repositionable by a user removing the deflection member 310 from a first notch and inserted it into a different notch.

In some embodiments, the extended position comprises a range of extended positions within a zone that extends along the guide, and the deflector 300 is slidable or otherwise movable to an extended position at various locations within the zone, such as anywhere within the zone, and retainable in those locations. In other embodiments, the deflector 300 is slidable or otherwise movable to a finite number of predetermined positions.

As shown in FIGS. 5A and 5B, deflector 300 can be magnetically held in the retracted position by a magnetic engagement. In some embodiments, magnet 224 on the housing 222 magnetically interacts with a ferrous material that is disposed on the exterior of the base member 316 or contained therewithin. For example, the base member 318 can have an interior that contains a magnet 220, which is attracted to the magnet 224 on the housing. The magnetic interaction between the magnets 224, 220 can be sufficiently strong to keep the deflector 300 in a retracted position. Magnet 224 can be positioned on the housing 222 adjacent the inner end 224 of the track guide 220 or in other suitable locations to maintain magnetic engagement with magnets 220 on the base member 316. The magnetic attraction can be strong enough to hold the base member 316 and deflector 300 in position, until a user grasps the deflector 300 with his/her hand. Other embodiments can use other mechanisms to retain the base member in retracted position, such as a mechanical locking mechanism.

The deflector 300 can include a handle portion 302 that extends from the housing 222 in the retracted position or that is otherwise accessible. Thus, a user can grasp the handle portion 302 and pull deflector 300 to disengage the magnetic attraction with magnet 224 and pull deflector 300 to an extended position. In some embodiments, in the retracted position, a substantial portion of the deflector is contained within the housing 222 and only the handle portion 302 extends from the housing 222.

Other embodiments can have other suitable mechanisms to deploy or move the deflector 300 to various positions. For example, the deflection member 310 can comprise a ratchet. A gear can be disposed within the guide 220, and the base member 316 can have one or more pawls for interacting with the gear. A simple ratchet mechanism that can be used includes a sprung finger that rides over teeth to retain the deflector 300 in one of several incremental positions and allow it to be overcome by hand by pushing in either direction.

The deflection member 310 can have a stop 326 that abuts the outer end 226 of the guide 220 in the extended position. The deflection member 310 can be biased in an extended position. For example, the dunnage machine 100 is free from a member that secures the deflection member 310 in the extended position. In other embodiments, an attachment mechanism (e.g., a magnet on housing 222 proximate outer end 226) secures the deflection member 310 in the extended position. In preferred embodiments, when positioned in the extended position, the deflection member 310 remains in the extended position, withstanding the force of dunnage 21 that contacts the deflector 300.

Figure 6A:
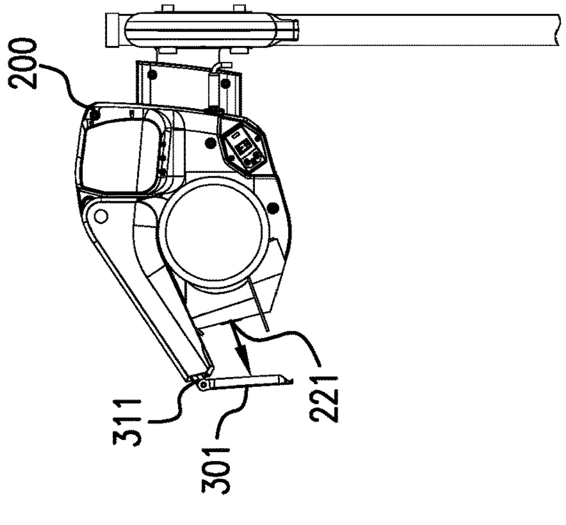
FIGS. 6A-6C are side views of an embodiment of a dunnage machine, with a dunnage deflector in various positions.
Figure 6B:
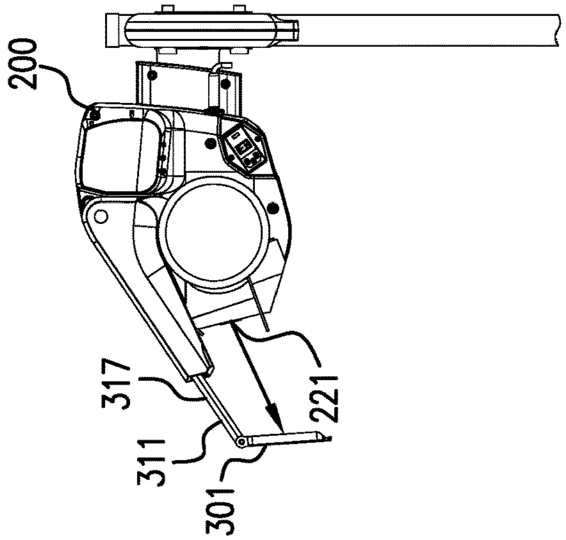
Figure 6C:
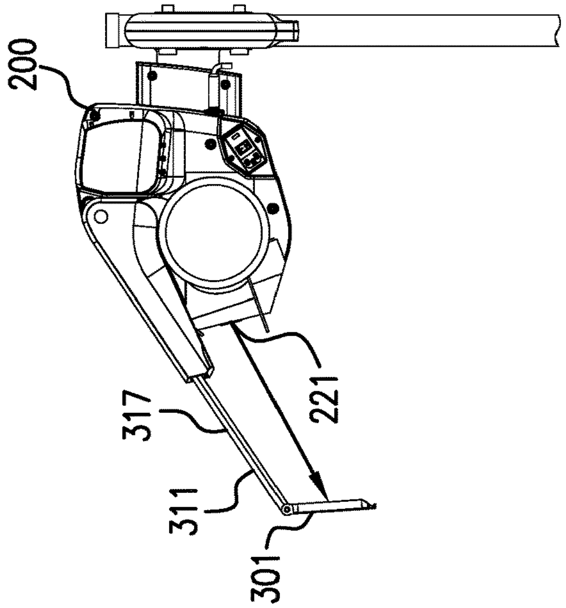
Figure 7B:
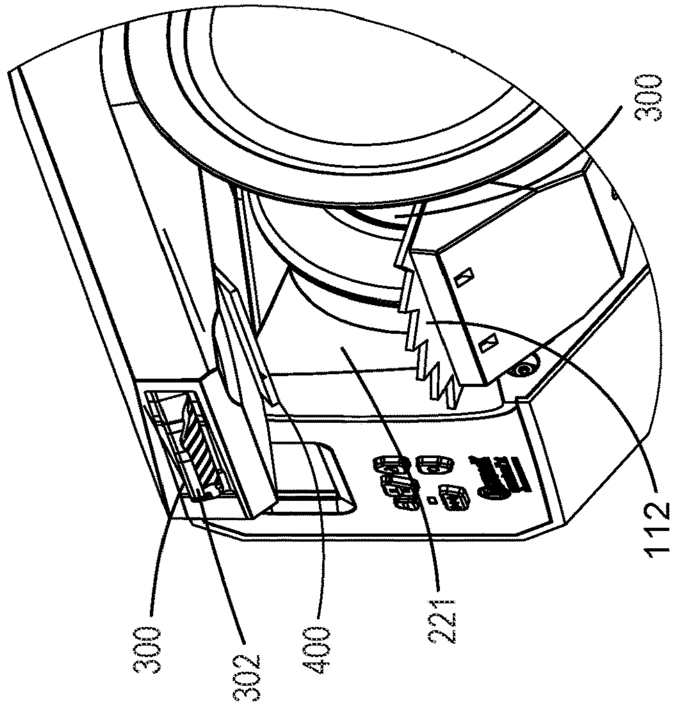
FIG. 7B is a close-up perspective view of portion A of FIG. 7A.
Figure 7A:
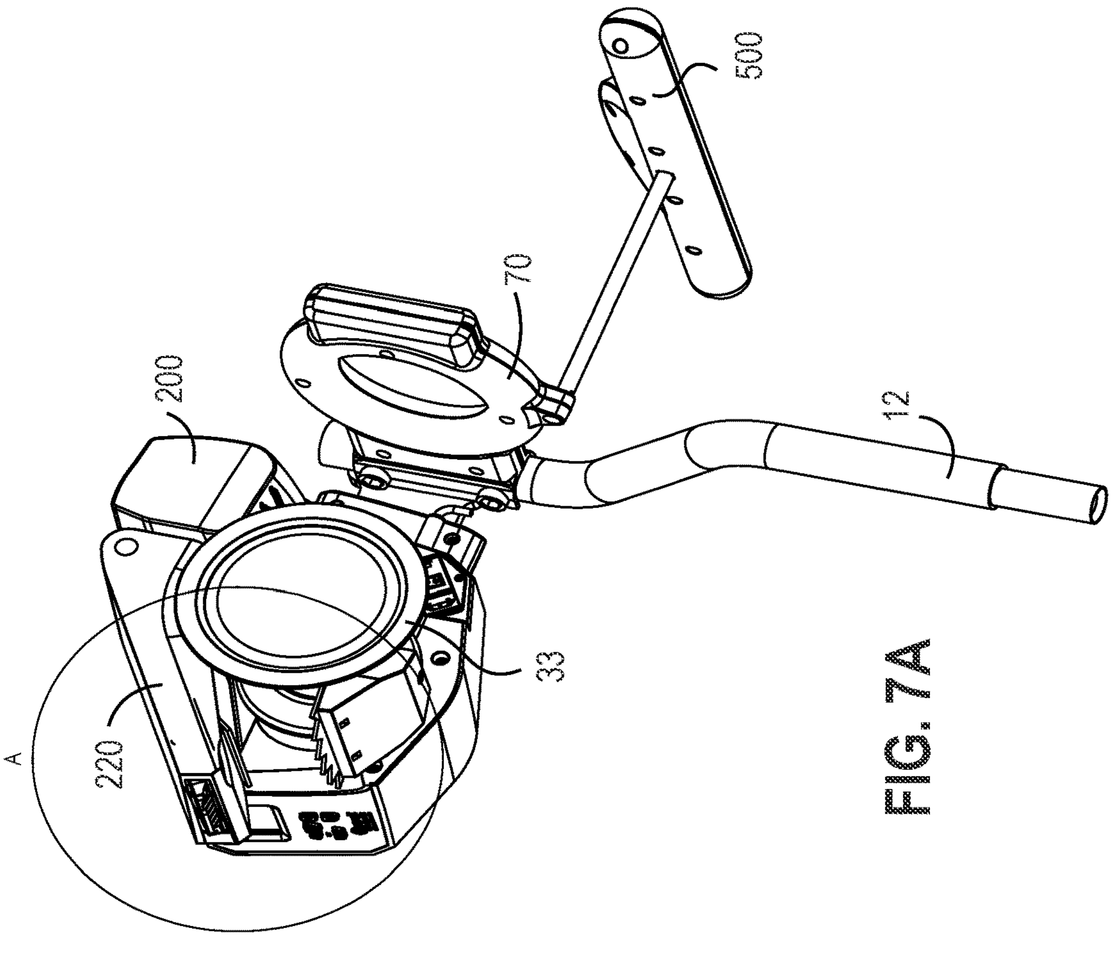
FIG. 7A is a perspective view of the dunnage machine of FIGS. 1A and 1B, including a deflector in a retracted position.

Referring now to FIGS. 6A-6C, in some embodiments, deflector 301 is repositionable relative to the exit 221 to various positions that are interposed in the path to deflect the dunnage. For example, the deflector can be repositionable towards and away from the exit 221 in the E-direction. FIGS. 6A, 6B, and 6C show deflector 301 positioned in a near position, intermediate position, and distal position, respectively. As shown in the embodiment of FIGS. 6A-6C, the length of the dunnage is greater than the distance between the deflector and the exit to simultaneously convert a portion of the length of dunnage while another portion of the length of dunnage is being deflected.

In some embodiments, the near, intermediate, and distal positions are included within a zone that extends along a direction (e.g., the E-direction), and the deflector 301 is slidable to an extended position at any location within the zone. For example, the deflector can be positionable in an infinite number of positions within the zone.

In other embodiments, the deflector 301 is slidable to a number of predetermined positions (e.g., the near, intermediate, and distal positions only). For example, the deflection member 311 can comprise a ratchet. A gear can be disposed within the guide 220, and the base member 317 can have one or more pawls for interacting with the gear. A simple ratchet mechanism that can be used includes a sprung finger that rides over teeth to retain the deflector 301 in one of several incremental positions and allow it to be overcome by hand by pushing in either direction.

Figure 8A:
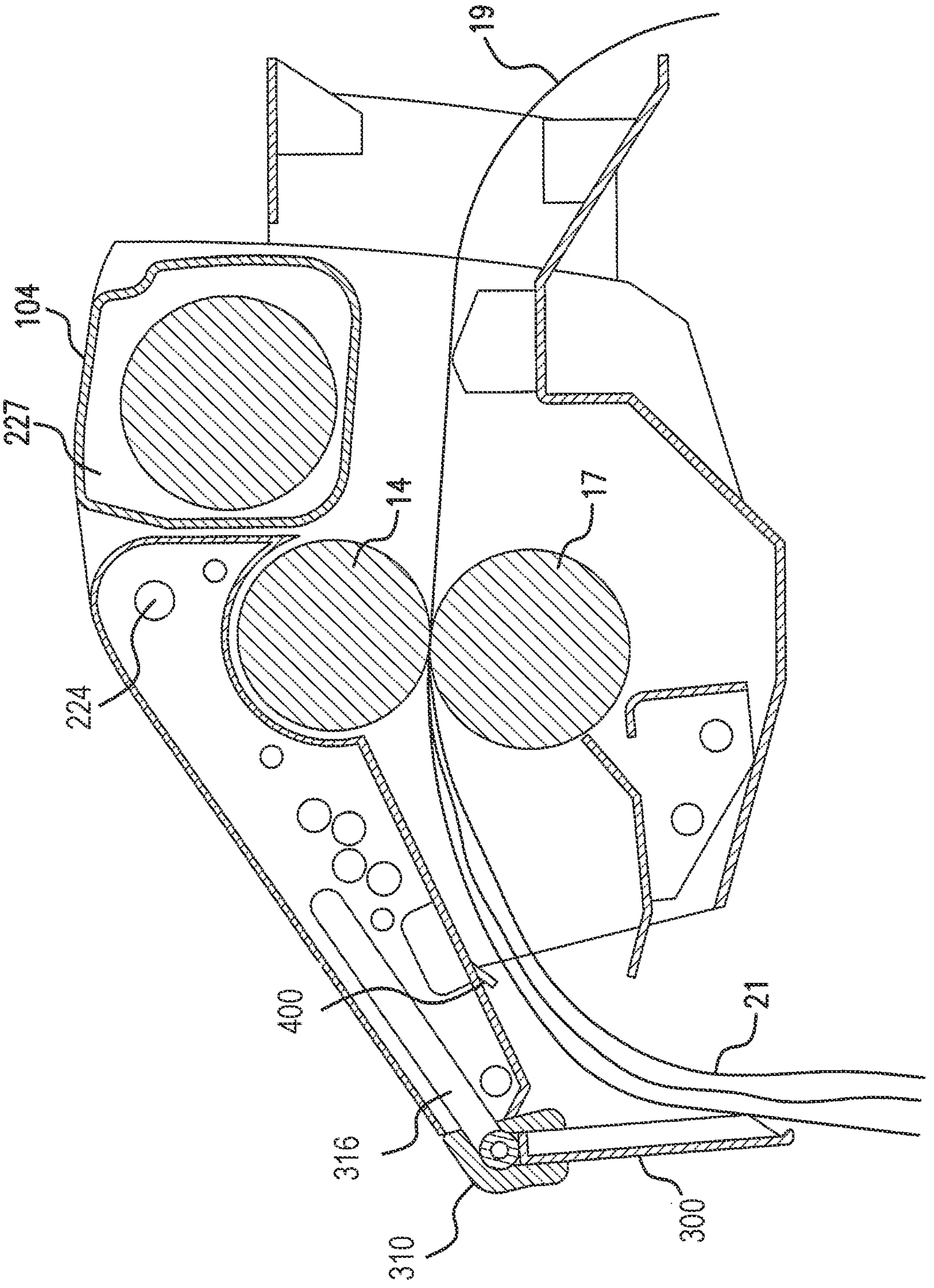
FIGS. 8A and 8B are cross-sectional views of the dunnage machine of FIGS. 1A and 1B, with the pressing portion in engaged and released positions.

As shown in FIGS. 4B and 8A, the dunnage machine 100 can comprise a static remover 400 that removes static buildup from the dunnage 32. Further details of a static remover are provide in U.S. application Ser. No. 15/592,646, filed May 11, 2017, entitled "Dunnage Apparatus with Static Remover," which is hereby incorporated by reference in its entirety.

In some instances, the static remover 400 contacts the dunnage 21 without interrupting the path of the dunnage 21 (e.g., without bending the path of the dunnage 21). The static remover 400 can be configured to contact dunnage 21 sufficiently to remove static, without changing the trajectory of the dunnage 21. For example, the static remover 400 can be configured so that the dunnage glides against a contact side of the static remover 400. In other instances, the static remover 400 contacts the dunnage 21 and bends the path of the dunnage 21. The static remover can be interposed in the path to deflect the path of the dunnage 21 from the exit trajectory to a deflected trajectory.

In instances in which both the static remover 400 and deflector 300 are interposed in the path of the dunnage 21, the static remover 400 can deflect the dunnage path from the exit trajectory to a first deflected trajectory, and the deflector 300 can deflect the dunnage path from the first deflected trajectory to a second deflected trajectory. Additionally or alternatively, the interposition of both the static remover 400 and the deflector 300, together in the dunnage path, operates to deflect the dunnage from the exit trajectory to a deflected trajectory.

Deflection of the dunnage, by one or more of the static remover 400 or the deflector 300, can direct the dunnage into a packaging container, thereby facilitating the packaging process.

The deflector 301 shown in FIGS. 6A-6C is part of deflection member 311 that is similar to the above described deflection member 310. Deflection member 311 includes a base 317, which can be similar to the above described base 316. For example, the deflection member 311 can interact with guide member 220 on the housing 222 to move relative to exit 221. In some embodiments, deflection member 311 differs from the above-described deflection member 310 in that it does not include the forward stop 326 (see FIGS. 5A and 5B). Thus, rear stop 324 abuts the exterior end 226 of guide 220 in the distal position (e.g., FIG. 6C). An intermediate stop can be positioned on the base between stops 326, 324, and the guide 220 can have a catch, for example, to help retain the deflection member 310 in an intermediate position (e.g., FIG. 6B). The engagement between the intermediate stop and catch can be configured to allow a user to overcome the engagement, for example, by pushing or pulling the deflection member 311 by hand. For example, the catch can comprise a bump within the guide 220, and the intermediate stop can be configured to move around the bump by a user applying some force by hand.

In some embodiments, in addition to the deflector 301 being repositionable along a direction (e.g., along the E-direction), the deflector 301 is also repositionable at various angles relative to the exit 221. For example, the deflector 301 can also pivot relative to the exit 221 (as shown in FIGS. 3A-3D).

Referring now to FIGS. 6A and 6B, in preferred embodiments, the dunnage machine 100 comprises a cutting member 112 disposed downstream of the exit 221 that severs a downstream portion of the ejected dunnage 21 from a portion of the dunnage still held by the converting station. In some embodiments, the cutting member 112 is disposed upstream of the deflector 300 with respect to the exit trajectory. In some embodiments, the cutting member 112 is disposed further from the exit than the deflector in at least one of the first or second positions. Preferably, the deflector 300 is disposed proximate the cutting member 112 to deflect the dunnage in a way to assist a user in cutting the dunnage 21 against the cutting member 112.

Figure 8B:
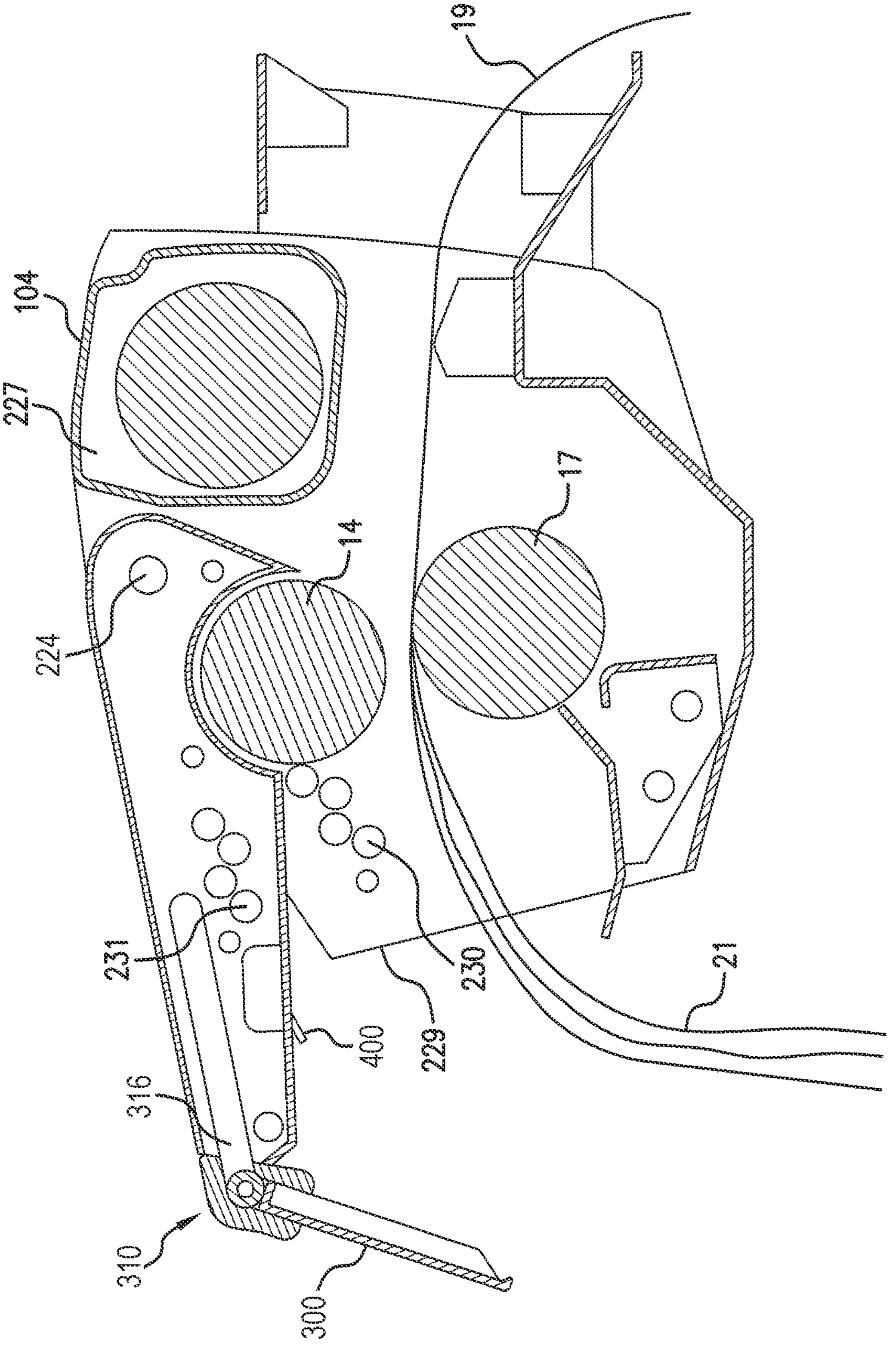

As shown in FIGS. 8A and 8B, the converting station 210 can have a pinch wheel 14 that is repositionable between an engaged position (FIG. 8A) and a released position (FIG. 8B). Converting station housing 210 can have a pressing portion 227 that houses the pinch wheel 14 biased against the drum 17 for crushing the stock material 19 passing between the pinch wheel 14 and the drum 17 to convert the stock material 19 into dunnage material 21. The pinch wheel 14 can be biased against the drum by way of a magnetic engagement. For example, a first magnetic member 231 can be arranged on the pressing portion 227 for interacting with a second magnetic member 230 on a lower housing portion 229. The first magnetic member 231 may be magnetically coupled, such as by magnetic attraction, to the second magnetic member 230 sufficiently to require a predetermined force tending to separate the pinch wheel 14 from the drum 17 to overcome the magnetic coupling. Forces tending to separate the rollers may occur, for example, if a paper jam occurs between the pinch wheel 14 and the drum 17. Once the magnetic counting is overcome, the bias of the pinch wheel 14 towards the drum 17 may be decreased or eliminated due to the proximity between the magnets decreasing. As such, removal of the jam or simply opening the device for servicing may be facilitated. Some exemplary embodiments of magnetic configurations can be found in U.S. Patent Publication No. 2012/0165172, entitled "Center-Fed Dunnage System Feed and Cutter."

Deflector 300 is attached to the pressing portion 227, so that the deflector 300 is repositionable along with the drum 17. Thus, when the pressing portion 227 is in the released position, for example to facilitate maintenance on the converting station, then the deflector 300 also moved out of the way.

In embodiments in which the converting station 202 comprises a static remover 400, the static remover 400 may be attached to the pressing portion 227, so that the static remover 400 is repositionable along with the wheel 14. For example, both the dunnage deflector 300 and the static remover 400 can both be repositionable together between engaged and releases positions along with the pinch wheel 14.

One having ordinary skill in the art should appreciate that there are numerous types and sizes of dunnage for which there can be a need or desire to accumulate or discharge according to an exemplary embodiment of the present invention. As used herein, the terms "top," "bottom," and/or other terms indicative of direction are used herein for convenience and to depict relational positions and/or directions between the parts of the embodiments. It will be appreciated that certain embodiments, or portions thereof, can also be oriented in other positions. In addition, the term "about" should generally be understood to refer to both the corresponding number and a range of numbers. In addition, all numerical ranges herein should be understood to include each whole integer within the range.

While illustrative embodiments of the invention are disclosed herein, it will be appreciated that numerous modifications and other embodiments may be devised by those skilled in the art. For example, the features for the various embodiments can be used in other embodiments. The converter having a drum, for example, can be replaced with other types of converters. Therefore, it will be understood that the appended claims are intended to cover all such modifications and embodiments that come within the spirit and scope of the present invention.

What is claimed is:

1. A dunnage apparatus, comprising:

a converting station that converts a line of a first density supply material into second density dunnage having a substantially lower density than the first density supply material, and wherein the converting station ejects the dunnage at an exit into an exit trajectory along a path; and a deflector mounted repositionably with respect to the exit, the deflector being repositionable between:

a first position, in which the deflector is interposed into the path of the exit trajectory to deflect the ejected dunnage traveling along the exit trajectory into a first deflected trajectory, and a second position, in which the deflector is interposed into the path of the exit trajectory to deflect the ejected dunnage traveling along the exit trajectory to a second deflected trajectory, wherein the deflector is mounted with respect to the converting station such that the deflector is selectively retained in each of the first position or the second position to withstand impact by the dunnage against the deflector to maintain a direction of the first deflected trajectory and the second deflected trajectory, respectively;

wherein the deflector is mounted pivotally with respect to the exit for pivoting about a pivot axis between the first and second positions, such that the deflector in the first position is oriented at a different angle than in the second position for deflecting the ejected dunnage travelling along the exit trajectory at a different downward angle when the deflector is positioned at the first position than when the deflector is positioned at the second position;

the deflector is mounted movably with respect to the exit such that the pivot axis is repositionable between a first distance downstream from the exit and a second distance downstream from the exit, such that the deflector is interposed into the path of the exit trajectory to deflect the exit trajectory at different distances when the pivot axis is positioned at the first distance from the exit than at the second distance from the exit; and in one or both of the first and second positions, an underside of the deflector is interposed into a top side of the path to deflect the dunnage downwards with respect to the trajectory of the dunnage at the exit.

2. The dunnage apparatus of claim 1, wherein the deflector, is further repositionable to a third position, wherein the deflector, when in the third position, is disposed out of the path of the exit trajectory to avoid deflecting the ejected dunnage.

3. The dunnage apparatus of claim 2, wherein:
the converting station includes a housing; and
the deflector, when in the third position, is retracted at least partially into the converting station housing.

4. The dunnage apparatus of claim 2, wherein the deflector, when in the third position, is positioned at least partially upstream of the exit.

5. The dunnage apparatus of claim 1, further comprising a deflector base, wherein the deflector is pivotally mounted about the pivot axis to the deflector base, wherein the deflector base is mounted movably with respect to the exit for changing a distance of the pivot axis from the exit.

6. The dunnage apparatus of claim 1, wherein:
the deflector at the first position is disposed at the first distance downstream from the exit; and
the deflector at the second position is disposed at the second distance downstream from the exit, such that the deflector is interposed into the path of the exit trajectory to deflect the exit trajectory at different distances when the deflector is positioned at the first position than at the second position.

7. The dunnage apparatus of claim 6, wherein the converting station is configured to eject a continuous length of the dunnage that is longer than the first distance to convert a portion of the continuous length of the dunnage while another portion of the continuous length of the dunnage is being deflected by the deflector.

8. The dunnage apparatus of claim 7, wherein the dunnage apparatus at and downstream of the deflector is free from any components underneath the path, so that the ejected dunnage, after hitting the deflector, falls into a container that is placed within the first deflected trajectory.

9. The dunnage apparatus of claim 1, further comprising a cutting member disposed downstream of the exit that severs a downstream portion of the ejected dunnage from a portion of the dunnage still held by the converting station.

10. The dunnage apparatus of claim 1, wherein the converting station comprises opposed crumpling members that crumple the supply material to convert the supply material into the dunnage and that eject the dunnage at the exit, wherein the exit is located at said crumpling members.

* * * * *